Oct. 13, 1931.   E. BLAU   1,827,136
DRIVER FOR WHEEL LATHES
Filed Sept. 14, 1929
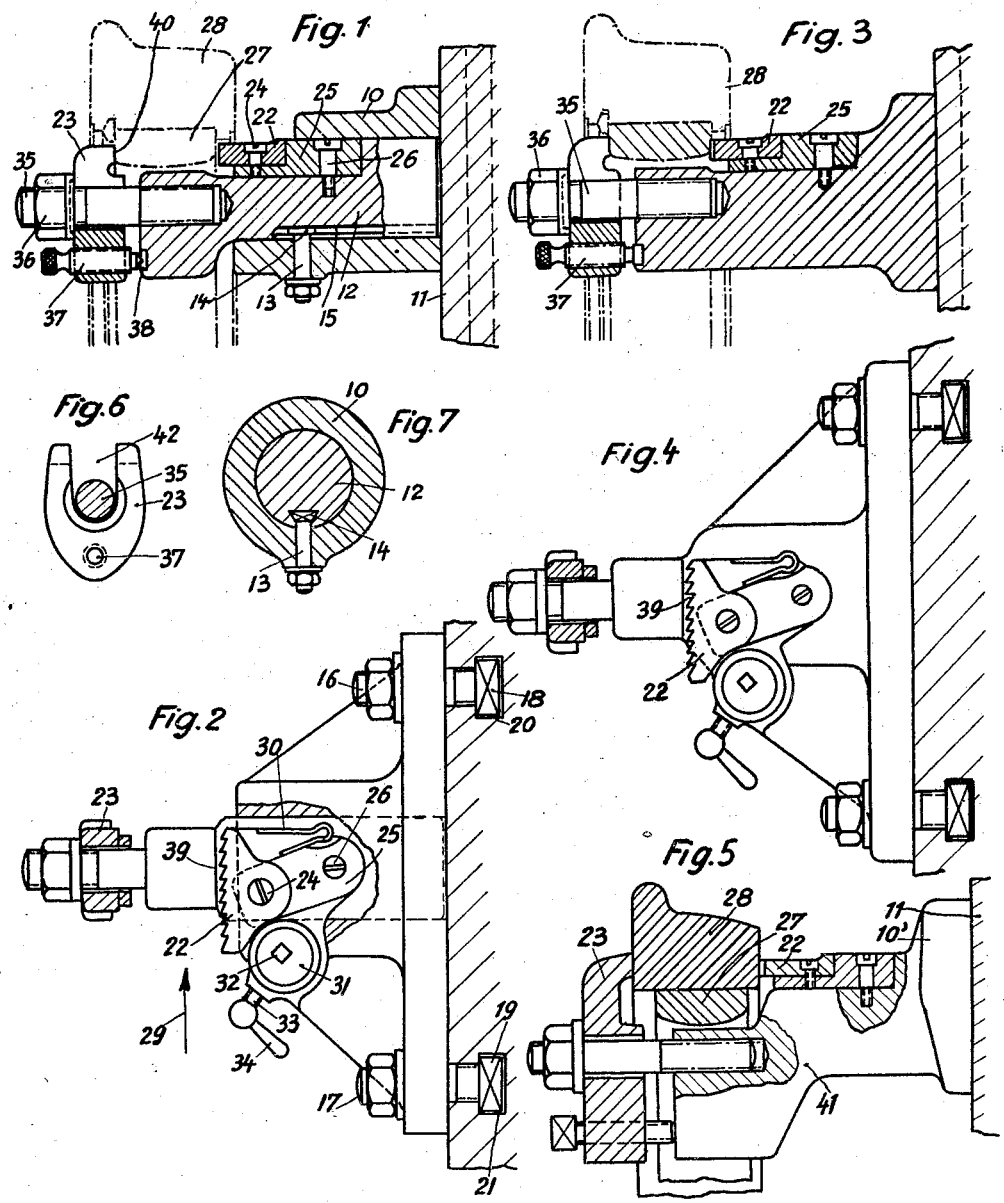
Inventor
Ernst Blau, Patented Oct. 13, 1931

1,827,136

UNITED STATES PATENT OFFICE

ERNST BLAU, OF BERLIN, GERMANY

DRIVER FOR WHEEL LATHES

Application filed September 14, 1929, Serial No. 392,718, and in Germany November 28, 1928.

My present invention relates to chucks or drivers for wheel lathes and particularly to chucks or drivers of the type in which jaws are provided for engaging the tire or the rim of a driven wheel, as differentiated from drivers engaging the spokes of the wheel or holes in the wheel center. Drivers of the type herein described are used especially on lathes for working on wheels or pairs of wheels for locomotives.

One of the objects of my invention is to provide a driver of that general type having means which will take up the axial pressure existing when the wheels are clamped by the jaws of the driver during the turning process. For this purpose I provide the driver with a clamping device, said clamping device being shaped in such a manner as to extend through a space between the spokes and the rim of the wheel to be turned and to be easily applied to and disconnected from the rim or the tire, as the case may be.

Another object of my invention is the provision of means on the driver enabling the latter to act as a "self-gripping" driving means, that is to say as a driving means the hold of which on the wheel is increased the more the cutting resistance and the circumferential pressure therewith is increased. For obtaining this object I provide special jaws which are pivotally connected to a shank which is fastened to the face plate of the lathe.

In previously proposed constructions of drivers for wheel lathes the said axial pressure either was taken up by the wheels and the face plates, on which in these cases a back pressure was exerted, or the axial pressure was exerted upon the spokes of the wheels if driving means were used comprising bolts arranged between the spokes and cross bars clamped against the bolts by means of nuts. In the first case heavy strain was exerted upon the lathe, in the second case the application of and the disconnection from the wheel of the driving means took much time.

These difficulties are overcome by my invention and the driver constructed according to it.

These and other objects of the invention will become more readily apparent upon a study of the following specification when read in connection with the accompanying drawings and appended claims.

In the drawings Fig. 1 is a central vertical section of a driver fixed on a face plate in engagement with the rim of a wheel.

Fig. 2 shows the driver of Fig. 1 in plan.

Fig. 3 is a section similar to that of Fig. 1 of another form of construction of a driver.

Fig. 4 is a plan view of the driver shown in Fig. 3.

Fig. 5 shows a further modification of the driver in section.

Figs. 6 and 7 show details of the driver, Fig. 6 being a section through the bolt on which the clamping member is mounted adjacent the clamping member, and Fig. 7 being a cross-sectional view through the casing and shank from which the gripping and clamping means are supported.

The driver as represented in Figs. 1 and 2 comprises a support or casing 10 which is secured to a face plate 11 of the lathe (not shown), and a shank 12 slidably mounted in said casing 10 in which it may be fastened by means of a bolt 13 the head 14 of which is guided in a longitudinal recess 15 of frustroconical cross-section provided in said shank 12. The casing 10 is secured to the face plate 11 by means of bolts 16 and 17 the heads 18 and 19 of which are arranged in slots 20 and 21 respectively provided in said face plate. The position of casing 10 in the face plate may be changed by these means and be adapted to wheels of different diameters.

Mounted on the shank 12 is a gripping jaw 22 and a clamping means such as a plate 23 adapted to react against the pressure exerted upon the rim of the wheel by the jaw 22. The gripping jaw 22 is pivotally connected by means of a bolt 24 to a lever 25 which is pivotally secured by a bolt 26 to the shank 12. This pivotal connection between the jaw 22 and the lever 25 and between that lever and the shank 12 is such that it works like a toggle lever connection tightening the grip of the jaw 22 on the rim 27 of the wheel (or on the tire 28, as the case may be) when the latter is moved relatively to the driving device in the direction of the arrow 29 shown in Fig. 2. A spring 30 is provided between the lever 25 and the shank 12 which spring tends to move said lever 25 and said jaw 22 away from the rim 27 that is to say against the tightening pressure.

For slightly tightening the gripping jaw to the rim when starting with the work a device is provided adapted to exert a slight starting pressure upon the jaw 22. This device comprises an eccentric 31 bearing against the lever 25 and being adapted to be rotated by a square head 32. A set screw 33 which may be actuated by means of a handle 34 serves to hold the eccentric in any position.

The clamping plate 23 is mounted on a bolt 35 on which it may be moved in a longitudinal direction and which is screwed into the shank 12. A nut 36 serves to press the plate 23 upon the rim 27 moving it on the bolt 35. The plate 23 may further be rotated upon that bolt for a purpose to be hereinafter described. Preferably an adjusting screw 37 is mounted in the lower part of plate 23 the free end of this adjusting screw being in contact with the shank 12. It is preferable to provide a piece 38 of hardened steel in the shank against which the free end of the adjusting screw bears in order to prevent the screw from being rotated.

The preferred form of the gripping face of the jaw 22 as shown in the drawings shows teeth 39 arranged on a substantially plane face. In this construction the tightening pressure is taken up by a plane. The toothed face may be constructed otherwise, for instance it may be arranged as a curved face eccentrically to its pivot. In this case the gripping jaw would only have contact with the rim along a line thus reducing the surface taking up the tightening pressure to a much smaller area.

In operation the driving means described are handled as follows:

The wheel or pair of wheels to be operated upon are moved towards the face plate 11.

During this movement the shank 12 (eventually together with the clamping plate 23) extends into the free space between two spokes and the rim of a wheel. The clamping plate may either be entirely taken off or—if not taken off—it is rotated on the bolt 35 for about 90 degrees in order that it may not touch the spokes or the rim when moving the wheel towards the face plate. When the distance between the wheel and the face plate is right, the eccentric 31 is rotated by means of the square head 32 until the gripping jaw 22 slightly is pressed against the rim 27. The eccentric 31 is then fixed in this position by screw 33 and handle 34. Thereupon the clamping plate 23 is brought into its operative position shown in Figs. 1 and 2 and is slightly pressed against the rim 27 by rotating the nut 36.

When the lathe is rotated and the cutting tool (not shown) is set a relative dislocation in the direction of arrow 29 takes place between the wheel held fast by the tool and the revolving face plate 11 bearing the driving means. The rim slides on the gripping surface 40 of the clamping plate 23. The gripping teeth of jaw 22 however are so tightly forced unto or even into the rim by means of the toggle lever effect exerted by lever 25 that the wheel or the pair of wheels is driven and rotated.

Before setting the tool upon the wheel but after effecting the provisional grip of the clamping plate 23 and of the gripping jaw 22 the shank 12 is fixed in the casing 10 by means of the bolt 13 so that no axial movement takes place between the shank and the casing.

It may not be in all cases necessary to mount the shank 12 in the casing 10 in such a manner that it may be shifted longitudinally. This will only be necessary if the distance $x$ (Fig. 1) between the wheel and the face plate may vary to a great extent on account of the lathe being constructed to be used for different wheels or pair of wheels. If the distance $x$ is constant or only varying to such a degree that the differences may be equalized by movement of the lever 25 the shank 12 may then be fastened to casing 10 or may be made integral with that casing or support.

An embodiment in which the shank is integral with the casing is shown in Figs. 3 and 4. Most of the parts shown in Figs. 1 and 2 are the same in Figs. 3 and 4 and are designed with the same reference numbers. The difference is that the casing or support 10' is not made hollow like the casing 10 shown in Figs. 1 and 2 but is made integral with a shank portion 10'' into which the screw bolt 35 of the clamping plate 23 is screwed.

In Fig. 5 a driving device is shown which is adapted to grip the wheel upon the tire 28 instead of upon the rim 27. The difference resides in the fact that the casing 10''' is cranked as at 41 in order that the clamping device 23 and the gripping jaw 22 may be applied to the tire. In the case of the embodiment shown in Fig. 1 and 2 the shank 12 may have a crank similar to that shown at 41.

Fig. 6 shows one form of construction of the clamping plate 23 which may be removed quickly. It is provided for that purpose with an opening 42. After loosening nut 36 the plate 23 may easily be withdrawn from the bolt 35 without entirely taking off said nut.

In Fig. 7 an example of the means for fixing shank 12 in casing 10 are shown in section. The head 14 of screw bolt 13 is guided in a conical recess 15. By tightening the bolt 13 the shank 12 and the casing 10 are fixed to one another.

It will be understood that the invention is not limited to the specific construction and arrangement of parts shown. For instance the clamping means 23 may be differently shaped and constructed. The common advantage for all modifications in this respect within the scope of the present invention is that such clamping means are easily to be rotated from and re-applied to said bolt.

Having now fully described my invention, what I claim and desire to protect by Letters Patent is:

1. A driver for wheel lathes, comprising a support adapted to be secured to the face-plate of the lathe, self-tightening gripping means movably connected to said support and adapted to grip the wheel, clamping means adapted to engage the wheel and mounted on said support, fastening means to movably and removably mount said clamping means on said support, said clamping means further adapted to be extended between two spokes and the rim of the wheel and to take up the axial pressure exerted upon the wheel by said gripping means.

2. A driver for wheel lathes, comprising a support adapted to be secured to the face-plate of the lathe, gripping means on said support adapted to grip the wheel, a toggle-lever connection between said gripping means and said support, said toggle lever connection including a lever pivotally secured to said support and pivotally connected to said gripping means, clamping means adapted to engage the wheel in opposition to said gripping means and mounted on said support, said clamping means adapted to take up the axial pressure exerted upon the wheel by said gripping means.

3. A driver for wheel lathes, comprising a support adapted to be secured to the face-plate of the lathe, gripping means adapted to grip the wheel with a force increasing in correspondence to the increase of cutting resistance, a lever pivoted to said support, said gripping means being pivotally connected to said lever, clamping means adapted to engage the wheel in opposition to said gripping means and movably and removably mounted on said support, said clamping means adapted to take up the axial pressure exerted upon the wheel by said gripping means.

4. A driver for wheel lathes, comprising a support adapted to be secured to the face-plate of the lathe, gripping means adapted to grip the wheel with a force increasing in correspondence to the increase of cutting resistance, a lever pivoted to said support, said gripping means being pivotally connected to said lever, a spring arranged between the support and said lever to push said gripping means in a direction opposite to that of the gripping pressure, means including an eccentric adapted to press the gripping means upon the wheel against the action of said spring, clamping means adapted to engage the wheel in opposition to said gripping means and movably and removably mounted on said support, said clamping means adapted to take up the axial pressure exerted upon the wheel by said gripping means.

5. A driver for wheel lathes, comprising a hollow support adapted to be secured to the face-plate of the lathe, a shank slidably mounted in said hollow support in a direction perpendicular to said face plate, means for fastening said shank in said hollow support, gripping means movably connected to said shank and adapted to grip the wheel with a force increasing in correspondence to the increase of cutting resistance, clamping means adapted to engage the wheel in opposition to said gripping means and movably and removably mounted on said shank, said clamping means adapted to take up the axial pressure exerted upon the wheel by said gripping means.

6. A driver for wheel lathes, comprising a hollow support adapted to be secured to the face-plate of the lathe, a shank slidably mounted in said hollow support in a direction perpendicular to said face plate, means for fastening said shank in said hollow support, gripping means movably connected to said shank and adapted to grip the wheel with a force increasing in correspondence to the increase of cutting resistance, a clamping plate adapted to engage the wheel in opposition to said gripping means, fastening means to connect said clamping plate to said shank, said fastening means including a bolt and a nut secured in said shank, an opening in said clamping plate to pass said bolt therethrough upon removal of said clamping plate without taking off said nut.

7. A driver for wheel lathes, comprising a support adapted to be secured to the face-plate of the lathe, gripping means adapted to grip the wheel with a force increasing in correspondence to the increase of cutting resistance, a lever pivoted to said support, said gripping means being pivotally connected to said lever, clamping means adapted to engage the wheel in opposition to said gripping means and movably and removably mounted on said support, said clamping means adapted to take up the axial pressure exerted upon the wheel by said gripping means, said gripping means having a teethed plane gripping face.

8. A driver for wheel lathes, comprising a support adapted to be secured to the face-plate of the lathe, gripping means movably connected to said support and adapted to grip the wheel, and a clamping member mounted on said support and being rotatable about an axis parallel to that of the wheel, said clamping member having a portion thereof offset from its axis and adapted to engage the wheel on the side opposite its engagement with the gripping means, whereby said clamping member may be rotated to move the wheel engaging portion thereof between the wheel spokes thereby to permit of movement of the support and clamping member through the wheel between the spokes, said clamping member being adapted to take up the axial pressure exerted upon the wheel by said gripping means.

In testimony whereof I affix my signature.

ERNST BLAU.